United States Patent [19]

Kuder

[11] 4,082,475
[45] Apr. 4, 1978

[54] HIGH SPEED REAMER ATTACHMENT FOR COAXIAL DRIVE FASTENER GUN

[75] Inventor: Alfred W. Kuder, Placentia, Calif.
[73] Assignee: Frank A. Klaus, Fullerton, Calif.
[21] Appl. No.: 776,089
[22] Filed: Mar. 9, 1977
[51] Int. Cl.² ............................................. B23B 47/04
[52] U.S. Cl. .................... 408/125; 408/126; 30/500; 74/801; 173/29
[58] Field of Search ...................... 408/126, 125, 124; 173/29; 74/785, 801; 30/500

[56] References Cited

U.S. PATENT DOCUMENTS

| | | | |
|---|---|---|---|
| 1,799,393 | 4/1931 | Rylander | 74/785 X |
| 3,134,275 | 5/1964 | Davidson | 408/126 X |
| 3,613,853 | 8/1971 | Linthicum | 74/785 X |

*Primary Examiner*—Gil Weidenfeld
*Attorney, Agent, or Firm*—Raymond L. Madsen

[57] ABSTRACT

There is disclosed an attachment for a counter-rotating coaxial drive fastener gun having a cylindrical housing adapted to be threadably attached to the outer drive member of a coaxial drive fastener gun and having an inner cavity with a ring gear fixedly attached therein. A spider has a projecting end thereon adapted to engage the inner drive of the coaxial drive fastener gun and further has a plurality of planetary gears journaled therearound and is inserted into the inner cavity of the cylindrical housing with the planetary gears engaging the ring gear. A central drive gear of smaller diameter than the planetary gears is inserted into a central opening between the planetary gears and engages each of the planetary gears. A reamer is removably coupled to the central drive gear and rotated thereby. A locking mechanism is attached to the coaxial drive fastener gun to prevent the outer drive member from rotating and allowing the inner drive member to rotate and turn the spider at the speed of rotation of the fastener gun which, in turn, rotates the central drive gear and reamer at a faster speed of rotation.

4 Claims, 6 Drawing Figures

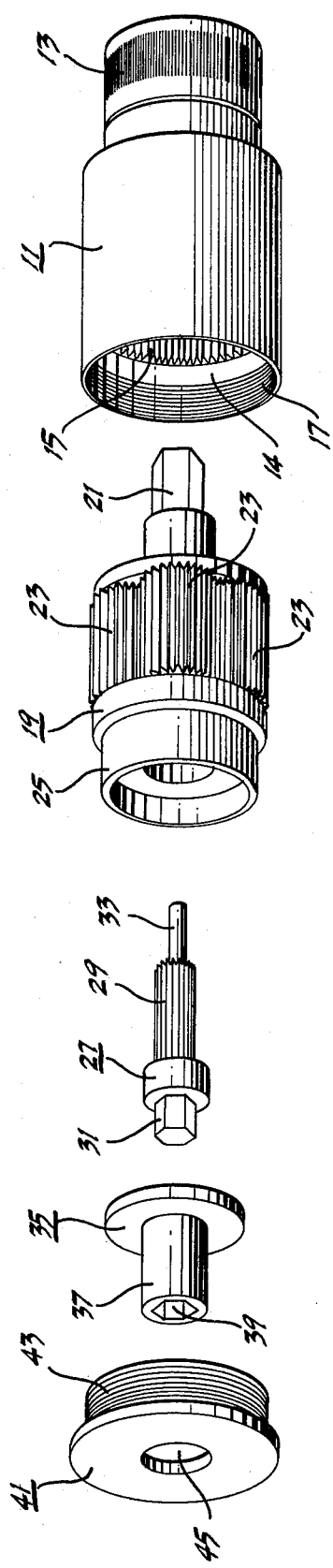
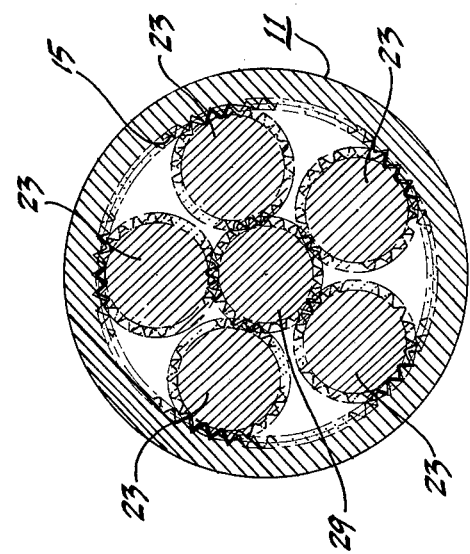
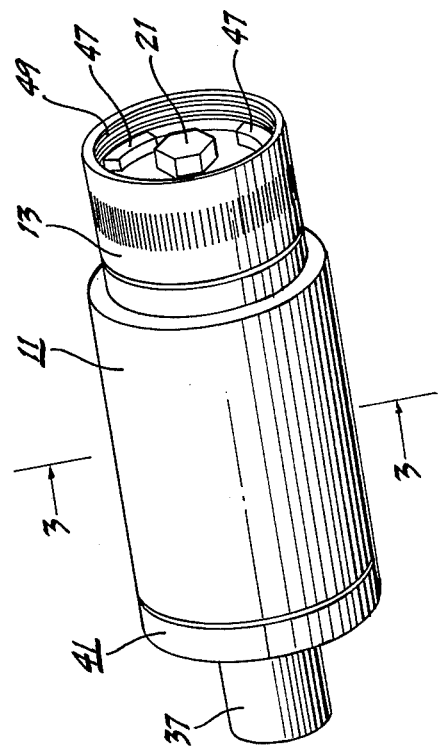

HIGH SPEED REAMER ATTACHMENT FOR COAXIAL DRIVE FASTENER GUN

The present invention relates to attachments for dual coaxial drive fastener guns and more particularly to a high speed reamer attachment for coaxial drive torque shear-bolt and nut fastener guns.

In the field of building and construction framing, it has been the general practice to employ dual coaxial drive fastener guns in conjunction with a structural bolt having a fluted torque-shear end on the threaded portion thereof and a nut threadably engaged thereon to coaxially drive the bolt and nut together in counter-rotation. The fluted end of the bolt is designed with a controlled torque groove circumferentially formed therearound at which groove the bolt shears when the desired torque has been reached. The coaxial drive fastener gun is designed to turn the nut and bolt against one another and when the bolt shears, the tightening or turning forces cease, thereby tightening the bolt and nut to the required shear torque determined by the groove in the fluted end of the bolt.

It has been the general practice to prepare the holes in the steel beams and girders to receive the torque-shear structural bolt by using a separate reaming tool for enlarging the holes to their proper size. Although such tools have served the purpose, they have not proved entirely satisfactory under all conditions of service for the reason that it is awkward and dangerous for construction personnel to be required to operate a number of construction tools at precarious heights and positions encountered in construction framing.

Those concerned with the development of power tools for building construction have long recognized the need for a single power tool which will both ream holes for torque-shear bolts and tighten the torque-shear bolt and nut thereon after the bolt is inserted into the hole. The present invention fulfills this need.

The general purpose of this invention is to provide a reaming attachment for a dual coaxial drive fastener gun which embraces all the advantages of similarly employed reaming tools and fastener guns and possesses none of the aforedescribed disadvantages. To attain this, the present invention contemplates a unique combination of gears and a locking mechanism whereby a dual coaxial drive fastener gun may be converted into a high speed reaming tool.

An object of the present invention is to provide a high speed reamer from a slow speed dual coaxial drive fastener gun.

Another object is to provide an attachment to a dual coaxial drive fastener gun which locks one of the driving members and increases the speed of rotation of the remaining driving member.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 illustrates an exploded perspective view of a preferred embodiment of the invention;

FIG. 2 shows a perspective view of the assembled invention of FIG. 1;

FIG. 3 shows a cross-section of the assembled invention taken on the line 3—3 of FIG. 2 looking in the direction of the arrows;

Figure 4:
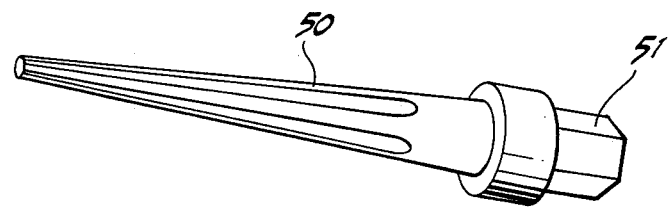
FIG. 4 illustrates a preferred embodiment of the reamer bit contemplated for use with the invention.

Referring now to the drawings wherein like reference characters designate like or corresponding parts throughout the several views, there is shown in FIG. 1 (which illustrates a preferred embodiment) a cylindrical housing 11 having a coupling sleeve 13 rotatably attached thereto and an interior cavity 14 into which a ring gear 15 is fixedly mounted and fastened to the interior cavity surface of cylindrical housing 11. The end of cylindrical housing 11 opposite coupling sleeve 13 has the interior surface thereof threaded with threads 17.

A spider 19 has a projecting end 21 thereon having a plurality of facets which may be engaged by the inner drive member socket of a dual coaxial drive fastener gun. A plurality of planetary gears 23 are journaled to spider 19 around the circumference thereof. A collar 25 is symetrically located about the other end of spider 19 opposite projecting end 21. The entire spider assembly fits inside interior cavity 14 of cylindrical housing 11 in a manner to engage planetary gears 23 with ring gear 15.

A central drive gear 27 has a cylindrical gear 29 of smaller diameter than planetary gears 23 to which is attached a multi-faceted coupling end 31 and an axel shaft 33 attached to the other end thereof. The central drive gear 27 is inserted into spider 19 such that gear 29 engages each of the planetary gears 23.

A coupling drive plate 35 has a socket 37 centrally located thereon with a socket opening 39 therein. Coupling drive plate 35 has a socket opening on the other side thereof (not visable) which receives coupling end 31 of central drive gear 27.

A circular threaded end plate 41 has a threaded collar 43 thereon and a hole 45 centrally located therethrough. Threaded collar 43 engages threads 17 of interior cavity 14 of cylindrical housing 11 to hold the entire assembly together. Hole 45 receives socket 37 therethrough in free rotatable engagement therein.

Turning now to FIG. 2, the invention illustrated in FIG. 1 is shown in an assembled condition. Interior to coupling sleeve 13 are threads 49 which are adapted to engage the threaded outer drive member of a dual coaxial drive fastener gun. The end of cylindrical housing 11 within coupling sleeve 13 has raised circular segments 47 therearound with depressed areas therebetween. Raised circular segments 47 mate with similar circular raised and depressed segments associated with the outer drive member of a dual coaxial drive fastener gun. Projecting end 21 of spider 19 projects through an opening in cylinder housing 11 centrally located within coupling sleeve 13. Projecting end 21 connects or couples with the inner drive member of a dual coaxial drive fastener gun.

FIG. 3 illustrates a cross-section view of the assembled apparatus of FIG. 2 taken on the line 3—3 of FIG. 2 looking in the direction of the arrows. Ring gear 15 engages each of the planetary gears 23 journaled to the spider. Gear 29 of central drive gear 27 is centrally located between each of planetary gears 23 and is engaged by each planetary gear. The diameter of gear 29 is chosen to be less than the diameter of planetary gears 23 in order to increase the speed of rotation of gear 29 and the central drive gear 27 over the normal rotation speed of a dual coaxial drive fastener gun.

FIG. 4 shows a reamer bit having a fluted end 50 and a faceted coupling end 51. Coupling end 51 is adapted to engage socket opening 39 of coupling drive plate 35. It should be noted that other tool bits may be used with this invention.

Figure 5:
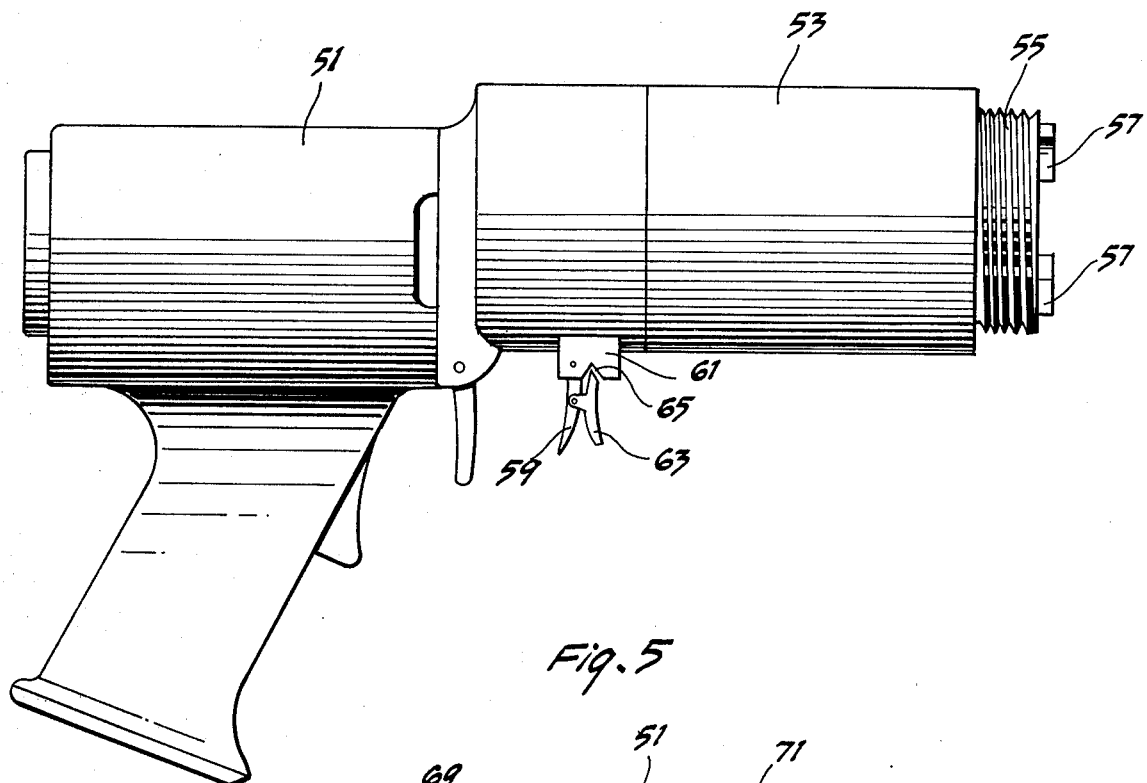
FIG. 5 illustrates a side view of a dual coaxial drive fastener gun equipped with the locking mechanism of the invention.

In FIG. 5 a dual coaxial drive fastener gun is illustrated having the locking mechanism of the present invention assembled thereon. A main housing 52 of the fastener gun is rotably connected to an outer drive member 53 which has a threaded circular collar 55 fixedly attached thereto and which further has raised circular segments 57 alternating with depressed segments around the circular edge of collar 55. Threads 49 of coupling sleeve 13 are adapted to engage threaded collar 55 of outer drive member 53. Similarly raised circular segments 47 and the depressed areas therebetween mate with raised circular segments 57 of threaded collar 55. A mounting bracket 61 is connected to main housing 52 and has a trigger 59 pivotally connected thereto, trigger 59 further having a rocker arm 63 pivotally connected substantially midway between the end thereof and the pivot point on mounting bracket 61. Mounting bracket 61 further has a notch or groove 65 therein which is engaged by one end of rocker arm 63 to prevent trigger 59 from being pivoted in one direction.

Figure 6:
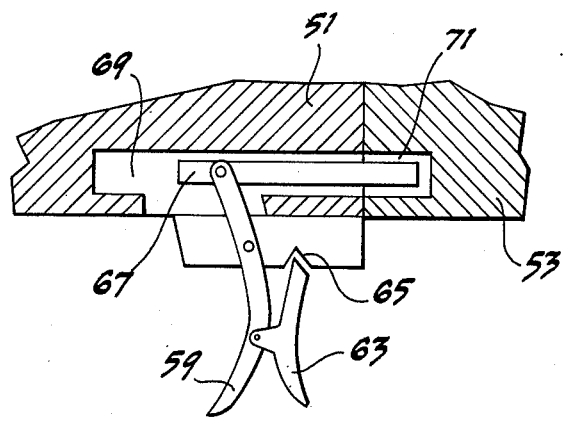
FIG. 6 illustrates a cut-away portion of the locking mechanism of FIG. 5 partly in vertical section and partly in side elevation.

In FIG. 6 a cutaway cross-section of main housing 52 and outer drive member 53 is shown with a sliding pin 67 pivotally attached to the end of trigger arm 59 and located with an elongated slot 69 in main housing 52 and an elongated slot 71 in outer drive member 53. When rocker arm 63 engages groove 65 in mounting bracket 61, trigger arm 59 is prevented from pivoting about mounting bracket 61 to prevent sliding pin 67 from disengaging elongated recessed hole 71 in outer drive member 53. Sliding pin 67 locks outer drive member 53 to main housing 52 and prevents the rotation of outer drive member 53 with respect to main housing 52.

The operation of the present invention may best be described by reference to FIGS. 1, 2 and 3. Spider 19 of FIG. 1 is rotated by the inner drive member of the fastener gun which engages projecting end 21 of spider 19. Therefore, planetary gears 23 are moved in circular motion within interior cavity 14 of cylindrical housing 11 at the speed of rotation of the inner drive member of the fastener gun. As planetary gears 23 are moved, they rotate in engagement with ring gear 15. The rotation of planetary gears 23 in turn rotates gear 29 of central drive gear 27. By selecting the relative diameters of planetary gears 23 and gear 29, gear 29 may be caused to rotate at a much higher speed of rotation than the speed of rotation of the inner drive member of the fastener gun. Consequently, the slow rotation of a fastener gun can be converted into a high speed reamer.

In order to prevent the outer drive member from rotating when the inner drive member of the dual coaxial drive fastener gun meets resistance, the locking mechanism of FIGS. 5 and 6 is employed. While rocker arm 63 is engaged in groove 65, sliding pin 67 cannot be removed from elongated recessed hole 71. Therefore, outer drive member 53 is securely locked to main housing 52 of the fastner gun and is prevented from rotating. When rocker arm 63 is removed from groove 65 trigger arm 59 may be pivoted about mounting bracket 61 to slide sliding pin 67 from elongated recessed hole 71 into elongated recessed hole 69 in the main housing. Then the fastner gun may be used in its normal application.

It now should be apparent than the present invention provides a mechanical arrangement which may be employed in conjunction with a dual coaxial drive fastener gun for adapting the fastener gun to a high speed reamer application.

Although particular components, etc., have been discussed in connection with a specific embodiment of an attachment constructed in accordance with the teachings of the present invention, others may be utilized. Furthermore, it will be understood that although an exemplary embodiment of the present invention has been disclosed and discussed, other applications and mechanical arrangements are possible in that the embodiments disclosed may be subjected to various changes, modifications and substitutions without necessarily departing from the spirit of the invention.

What is claimed is:

1. An attachment for a counter-rotating coaxial drive fastener gun comprising:

A cylindrical housing having a coupling sleeve which is adapted to engage the outer drive member of a coaxial drive fastener gun, said cylindrical housing having an inner cavity within which a ring gear is fixedly attached;

A spider having a projecting end adapted to engage the inner drive member of a coaxial drive fastener gun, said spider having a plurality of identical planetary gears journaled therearound with a central opening between said planetary gears adapted to receive a central drive gear of diameter smaller than the diameter of said planetary gears and which engages each of said planetary gears, said spider and said planetary gears being positioned in said inner cavity of said cylindrical housing such that each of said planetary gears engage said ring gear and said projection end is centrally located within said coupling sleeve;

A central drive gear located within said central opening between said planetary gears of said spider and engaging each of said planetary gears, said central drive gear being adapted to be coupled to a reamer;

A reamer removably connected to said central drive gear; and

A locking mechanism adapted to be connected to a coaxial drive fastener gun for locking the outer drive member from rotating whereby the inner drive member is free to rotate said spider at the speed of rotation of the fastener gun which, in turn, through said planetary gears rotates said central drive gear and said reamer attached thereto at a higher speed of rotation.

2. The attachment described in claim 1 wherein said locking mechanism comprises:

A sliding pin which is adapted to be inserted into an elongated recessed hole in the outer drive member and a mating hole in the main housing of a coaxial drive fastener gun;

A mounting bracket adapted to be fixedly attached to the main housing of a coaxial fastener gun, said mounting bracket having a groove therein adapted to receive the end of a rocker arm;

A trigger arm having one end thereof pivotally attached to said sliding pin and further being pivotally attached to said mounting bracket substantially between said one end and the other end thereof; and A rocker arm pivotally attached to said trigger arm between the mounting bracket pivot point and said other end of said trigger arm, said rocker arm having one end thereof adapted to be pivoted to engage said groove in said mounting bracket to lock said trigger arm and said sliding pin in a position to prevent the rotation of the outer drive member with respect to the main housing of a coaxial drive fastener gun.

3. The attachment described in claim 1 wherein said central drive gear has a multi-faceted shaft thereon adapted to mate with and engage a multi-faceted socket and wherein the opening into said inner cavity of said cylindrical housing is threaded on the interior surface thereof, further including:

A coupling drive plate having a socket on one side thereof into which said multi-faceted shaft of said central drive gear is engaged and having another socket on the other side thereof dapted to receive and engage said reamer; and A circular threaded end plate having an opening therethrough through which said another socket of said coupling drive plate rotatably projects, said collar being threadably attached to said cylindrical housing to contain the assembling of said coupling drive plate, central drive gear and spider in rotatable engagement.

4. A construction reamer for reaming holes for torque-shear bolts comprising:

A dual coaxial drive fastener gun having an inner drive member and an outer drive member in coaxial alignment with one another;

A cylindrical housing having a coupling sleeve connected to said outer drive member, said cylindrical housing having an inner cavity with a ring gear fixedly attached therein;

A spider having a projecting end thereon engaged and connected to said inner drive member of said dual coaxial fastener gun, said spider having a plurality of identical planetary gears journaled therearound with a central opening between said planetary gears adapted to receive a central drive gear of diameter smaller than the diameter of said planetary gears and which engages each of said planetary gears, said spider and said planetary gears being positioned in said inner cavity of said cylindrical housing such that each of said planetary gears engage said ring;

A central drive gear located within said central opening between said planetary gears of said spider and engaging each of said planetary gears, said central drive gear being adapted to be coupled to a reamer;

A reamer removably connected to said central drive gear; and

A locking mechanism connected to said dual coaxial drive fastener gun for locking the outer drive member from rotating whereby the inner drive member is free to rotate said spider at the speed of rotation of the fastener gun which, in turn, through said planetary gears rotates said central drive gear and said reamer attached thereto at a higher speed of rotation.

* * * * *